Aug. 7, 1956  R. F. SCHABER  2,758,289
ELECTRICALLY CONDUCTIVE FLEXIBLE SHAFT COUPLING
Filed Oct. 13, 1951  2 Sheets-Sheet 1
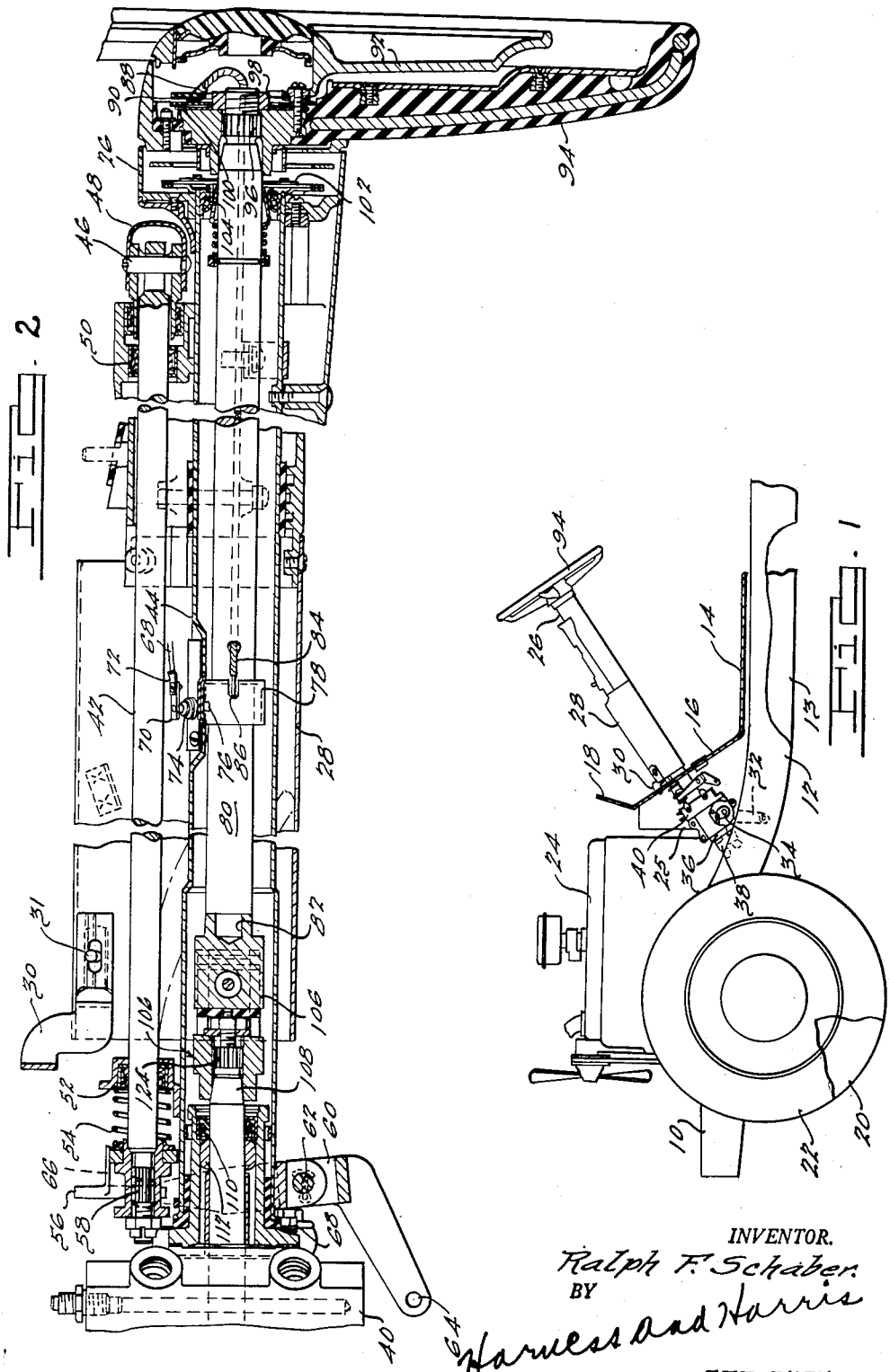
INVENTOR.
Ralph F. Schaber
BY
Harness and Harris
ATTORNEYS.

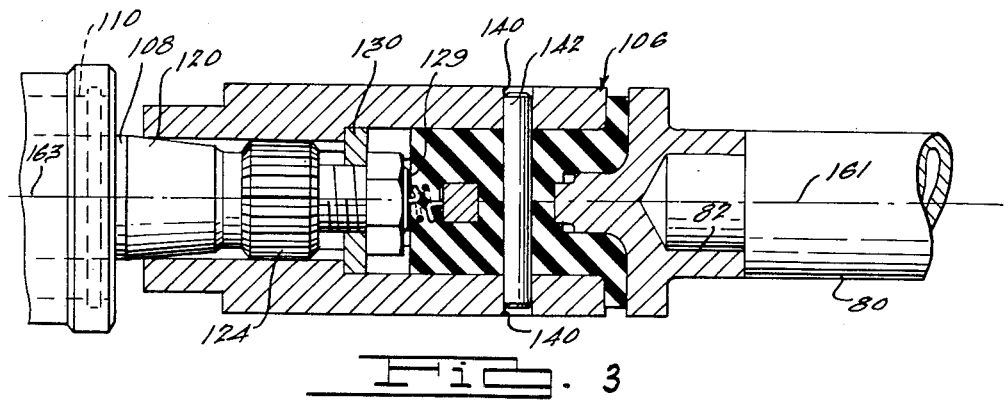
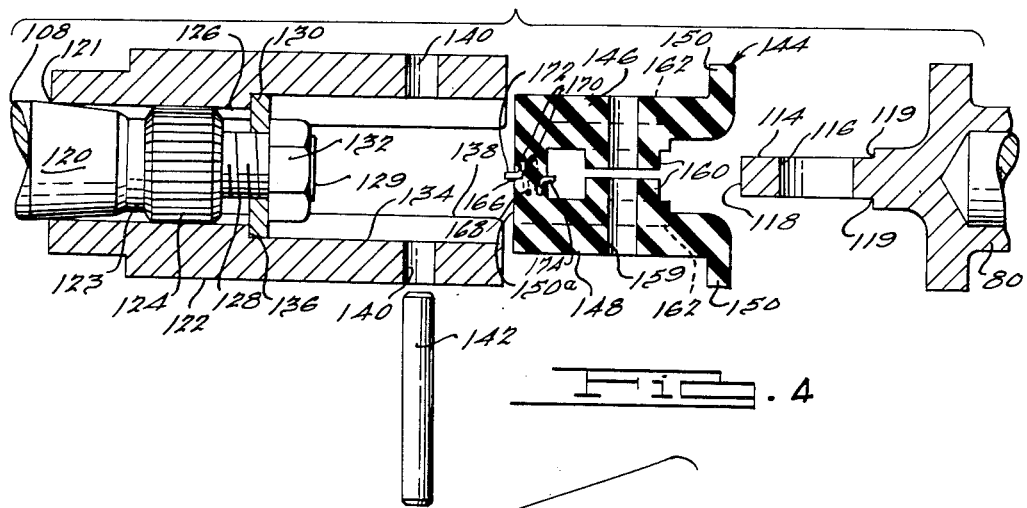

United States Patent Office 2,758,289
Patented Aug. 7, 1956

2,758,289

ELECTRICALLY CONDUCTIVE FLEXIBLE SHAFT COUPLING

Ralph F. Schaber, Centerline, Mich., assignor to Chrysler Corporation, Highland Park, Mich., a corporation of Delaware Application October 13, 1951, Serial No. 251,223

6 Claims. (Cl. 339—2)

This application relates generally to an electrically conductive yieldable coupling or joint, and particularly to a noise insulating electrically conductive coupling which may be adapted to transmit universal motion and which finds special utility in steering columns and the like to transmit torsion and at the same time to provide a ground return circuit for an electric horn button or the like.

The present invention has for its objects the provision of a compressible protruding metal member in an elastic rubber or similarly yieldable elastomeric coupling part; the provision of a multi-part steering shaft having at least two pieces which are torsionally interconnected by said coupling part between the adjacent ends of which the compressible metal member presses and provides pressure contact to complete a horn grounding circuit; and the provision of a metallic conductor in a noise and electrically insulative coupling member which will not to a pronounced degree interfere with the noise insulating qualities of the coupling member but which will at the same time circumvent the inherent disadvantage of electrical non-conductivity in the coupling member.

In carrying out the foregoing objects, the metallic conductor above referred to is disposed substantially at the longitudinal center line of the joint and the points at which the conductor end portions make pressure contact with the coupled members are similarly disposed relative to the longitudinal center line of the joint.

According to a feature of the present invention, an elastic metal member is inserted through an opening in the wall of the electrically non-conductive yieldable coupling part, which protrudes from the ends of the opening so as to be exposed to pressure contact at its ends with the electrically conductive metallic coupling parts disposed respectively thereadjacent.

According to another feature, provision is made for a joint-forming insulative coupling part having a simple positive acting ground path formed of wear-resistant and relatively service-free material. Such material must, of course, be either a metallic conductor or else manifest the qualities of an electrically conductive metal.

According to a further feature of the invention provision is made for a torsion-transmitting deformable member having a conductive path introduced thereacross which is arranged to form its own path end contacts at points substantially coincident with the longitudinal axis of torsion.

Other features, objects, and advantages will either be specifically pointed out or become apparent when for a better understanding of the invention, reference is made to the following detailed description taken in conjunction with the accompanying drawings in which:

Figure 1 is a fragmentary side view of a steered automotive vehicle to which the invention is applied;

Figure 2 is a longitudinal section through the steering column of the vehicle showing the jointed torsion-transmitting steering shaft therein;

Figures 3 and 4 are enlarged assembly and exploded views respectively of the torsion joint in the shaft of the steering column; and Figure 5 is a perspective view showing the relationship of the yieldable coupling part interposed in the torsion joint.

In Figures 1 and 2, a vehicle 10 is shown having a chassis which includes frame side members 12 and 13 and a body which is supported thereupon and includes a floor pan 14. The floor pan 14 is angled at its forward end to provide a toe board 16, and the toe board is in turn angled at its forward end to provide a substantially vertically arranged dash 18. The vehicle chassis at the front is suitably suspended from a pair of front steerable wheels 20, 22. Vehicle 10 is self-propelled, having a propulsion engine 24 supported on the vehicle chassis between the front wheels 20, 22.

To the rear of the engine 24 there is located a transmission 25 for the vehicle. A steering post 26 arranged in the body of the vehicle has a jacket 28. A bracket 30 held by a fastener 31 to the steering post jacket 28 secures the jacket to the toe board 16 of the vehicle body. At the bottom of the steering post 26 there is provided a depending pitman arm 32 which is connected at its lower end so as to operate the steering linkage, not shown, for the front steerable wheels 20, 22. The pitman arm 32 is carried at its upper end by a rockshaft horizontally disposed in sets of bearings, one set of which is carried in the rockshaft bearing case 34.

The steering gear is provided with the usual worm and roller arrangement for operating the rockshaft, the worm thereof being journalled at one end in the casing 36. A power mechanism may be provided to assist in the steering effort and includes a pair of drawn steel power cylinders 38 which are located in a laterally offset relationship relative to steering post 26. Power cylinders 38 are operatively arranged to apply torque to the rockshaft and the pitman arm 32 and are controlled by a fluid system which includes a control valve case 40 for control valves which supply pressure fluid selectively to the respective power cylinders 38.

Lying alongside of but laterally offset with respect to the steering post 26, there is provided a shift lever shaft 42 which is pivoted at its upper end at 46 to a manually operated shift lever 48 which is supported for conventional swinging movement in two planes and extends laterally with respect to steering post 26. The steering post 26 includes a steering column 44 which supports bearings 50 and 52 at its extremities in which the shift lever shaft 42 is journalled for axial and rotative movement. A coil spring 54 surrounds the base of shift lever shaft 42 and resiliently opposes axial movement of the latter upwardly along the steering post 26. A laterally extending arm 56 has one end splined at 58 to shift lever shaft 42 for rotation therewith, and has the opposite end adapted to be connected to a shifter rod for the shiftable gears in the transmission 25. A bellcrank 60 has a fixed pivot 62 about which it swings and is provided at one extremity with a pivot opening 64 by which it is connected to a selector rod for effecting cross-over between the selectable gears in transmission 25 for the vehicle. The bellcrank 60 has its opposite extremity rounded off as at 66 for reception in a slot formed in a member axially shifted by shift lever shaft 42.

A ground-side conductor 68 for the vehicle horn relay, not shown, has a connector 72 connected to a bracket 70 supported by the end of an insulated stud 74 carried in a plate at the side of the steering column 44. On the opposite end of stud 74 there is mounted a spring finger 76, which either directly or through a carbon brush, frictionally rubs against a collar 78 insulatedly mounted upon the upper piece 80 of a two-piece steering tube or shaft. Upper piece 80 is hollow, as at 82, and contains a conductor therein at 84 which emerges from the hollow 82 and is welded or soldered at 86 to the insulated collar 78. The spring finger 76 and the connected end of conductor 84 are thus electrically connected to one another through the collar 78 insulated from the piece 80 of the steering shaft. The conductor 84 extends up through the hollow of shaft piece 80 and emerges at the end where it has a connector 88 connected to an insulation-backed travel plate 90. The travel plate 90 is arranged to be operated by a horn ring 92 which is resiliently tiltably carried by a steering wheel 94. The steering wheel 94 is splined at 96 to the upper shaft piece 80 for rotation therewith and is secured thereto by means of a nut 98.

A spring 100 is provided underneath travel plate 90 so as normally to hold the travel plate 90 out of contact with the ground plate 102. Depression or tilt of the horn ring 92, however, effects contact between the ground plate 102 and the travel plate 90 carrying connector 88 for the conductor 84. The upper piece 80 of the two-piece steering shaft is journalled at the top end in a bearing 104 for rotation relative to steering column 44 and is connected at its bottom end by a joint 106 to the lower piece 108 of the two-piece steering shaft. Lower piece 108 is annularly sealed at 110 and mounted in a spherical bearing 112 which permits a tilting motion to occur between the axes of pieces 80 and 108 with respect to the joint 106 as a center.

In Figures 3, 4, and 5, the hollow steering shaft upper piece 80 has its bottom end formed so as to provide a broad flat tongue portion 114 which is thickened in one section and presents shoulders 119. A large aperture 116 is formed in the tongue portion 114 between the shoulders 119 and a flat transverse end surface 118 on shaft piece 80. The lower steering shaft piece 108 is made up of an assembly of parts including an inner member 123 and an outer or yoke part 122 which together form the protruding end portion of the piece 108. Inner member 123 is sectioned so as to have a rear tapered section 120 forming a shoulder, an intermediate section provided with a set of external splined teeth 124, and a threaded forward section 128 at its end. The tapered shoulder 120 engages an end 121 of the outer part 122 and the set of splined teeth 124 engages an internal set of splined teeth 126 provided within outer part 122. A washer 130 is received over the threads of the section 128 and is held in place by a nut 132 which is advanced over the threads far enough to leave exposed a transverse end surface 129 at the threaded forward end of the inner member 123. Outer part 122 has a cylindrical internal recess 134 which at the bottom provides shoulders 136 engaged by the washer 130. Washer 130 and the opposite shoulder 120 cooperate to prevent axial movement of inner member 123 relative to outer part 122 and the splines 124, 126 prevent movement of rotation between inner member 123 and outer part 122. Outer part 122 has a pair of diametrically opposed longitudinal slots 138 which terminate in the region of the shoulders 136.

Disposed in a 90° relationship to the slots 138, there is provided a pair of diametrically opposed apertures 140 in the walls of outer part 122. The apertures 140 are arranged to accommodate in press fit a pin 142 which cooperates with the tongue portion 114 and a yieldable coupling part 144 to form the yieldable joint 106. Yieldable member 144 is preferably composed of one piece of a deformable rubber or similar elastomeric material and has a general U-shape including a pair of legs 146 and 148 interconnected by a short base or web member 150. Base 150 acts as a separating wall between the end portions of shaft pieces 108 and 80 and has a relatively short but laterally wide dimension along the surface 164. Legs 146 and 148 have a pair of outwardly extending radial flanges 150 and also have a pair of inwardly extending raised buttons 160 which are formed on the surface of a pair of flat laterally extending wings 162. Wings 162 have the same lateral extent as does the short but wide end wall 150a which interconnects legs 146 and 148.

The joint 106 is arranged to transmit torsion between shaft pieces 80 and 108 in a manner such as will permit limited universal action between the respective axes 161 and 163 of the shaft pieces. The joint 106 is assembled as follows. The yieldable coupling part 144 is received by the end of tongue portion 114 such that the end wall 150a of the former covers over the end surface 118 of the latter and such that the buttons 160 occupy and fill up the opening 116 formed in the tongue portion 114. The pin 142 is received in the openings 140 in outer part 122 in press fitted engagement, and passes through the registering pin receiving openings 159 formed in the yieldable coupling part 144.

It will be apparent that the outer part 122 and pin 142, which are frictionally connected together as a unit, are insulated at all points by rubber from the upper steering shaft piece 80. Inasmuch as the rubber will yield to some extent in any and all directions, a universal action is afforded in the joint 106 between parts 80 and 108 and torsion may be transmitted at the same time in this joint between these two parts through the intermediary of the laterally extending rubber wings 162.

Formed in the end wall 150a of member 144 is a tortuous opening 166 which is formed as a result of vulcanizing therein a coil spring of a conductive metal. The coil spring has a convoluted central section 170, which renders the member elastic, and deflectable end portions 172, 174 which are carried at the ends of the coils or convolutions of the central section 170.

During assemblage of the yieldable joint 106 at the time when the end surfaces 129 and 118 are brought into closely spaced proximity, the end wall 150a of coupling member 144 is compressed therebetween and also the coil spring is compressed such that the end portions 172 and 174 are pressed against the respective surfaces 129, 118 to provide electrical pressure contact therewith.

It will be seen that the point of contact between spring end portion 172 and the relatively depressed transverse surface 129 formed by inner member 123 relative to outer part 122, lies generally along the central longitudinal axis of the yieldable joint 106. Likewise the point of pressure contact between end portion 174 of the coil spring and the end surface 118 of shaft piece 80 is disposed generally along the central longitudinal axis of portion 161 of the yieldable joint 106. The results of such disposition are that the points of contact are subjected to a minimum of movement during operation of the joint and there is little or no tendency for a poor electrical contact to develop or result during operation of the joint.

The ground return circuit completed by the grounding coil spring is as follows. The horn relay conductor 68 is connected at 72 to a bracket 70 and the insulated stud 74 which through the resilient finger 76 provides a brush connection to the insulated collar 78 on steering shaft piece 80. The brush 76 and collar 78 are slidable relative to one another and provide pressure contact during all rotational movement of rotatable steering shaft piece 80. The conductor 84 interconnects insulated collar 78 with the insulated travel plate 90 in the horn ring assembly. When the horn ring 92 is tilted, an electrical path is completed between the travel plate 90 and a ground plate 102 carried by the steering wheel 94 and the supporting steering shaft piece 80. Despite the presence of yieldable coupling member 144, steering shaft piece 80 is grounded through pressure contact with the ground spring, to the lower shaft piece 108. The lower shaft piece 108 is in turn grounded through its casing to the vehicle side rail 12 and chassis thus completing the ground return circuit for the horn relay.

As herein disclosed, the invention is shown embodied in a power assisted steering arrangement. It is evident that the present invention will be equally effective in steering arrangements of other types and that it can be appropriately included in purely mechanical steering mechanisms and also in purely power-operated mechanisms. So also the drawing shows the grounding coil spring to be vulcanized into the end wall of the rubber coupling member but self-evidently the end wall can be provided with a straight bore therethrough of a diameter equal to or slightly less than the coil diameter of the grounding spring such that the latter can frictionally engage the sides of the straight bore for frictional retention therein. The power cylinder member and shift lever shaft member are shown to be laterally offset with respect to the common axis of the steering column and steering shaft but indeed, it is not essential to the invention that the former two members be offset with respect to the steering axis and one or both of these members can equally well be concentric with the steering axis. So also the drawing shows the coil spring included in a ground return circuit which employs a horn ring type switch but self-evidently the circuit can be operated by a plain horn button switch and the coil spring can conceivably be used in any appropriate electrical return circuit whether switch actuated or not.

Variations within the spirit and scope of the invention described are equally comprehended by the foregoing description.

By the term "rubber" in the specification and claims is meant any yielding material having the characteristics of elastic rubber or plastic or other elastomer.

What is claimed is:

1. The combination with a two-piece steering shaft, of means connecting the two pieces in a ground circuit joint yieldably transmitting torsion between the pieces, said ground circuit joint comprising means forming male and female portions at the respective ends of the two pieces, said female portion having a depressed central region provided with internally received surface presenting means therewithin, a yieldable non-metallic noise insulating member received over the end of the male portion and having side walls lying along at least two opposite sides of the male portion and having an end wall against the end surface of the male portion and interconnecting the side walls to one another, and spring means formed of a conductive metallic member and received in the noise insulating member end wall so as to protrude in opposite directions therefrom, said noise insulating member and said male portion being received in said female portion with the member end wall disposed between the end surface of the male portion and the internally presented surface within the female portion, said just-named surfaces respectively abutting the included protruding spring means and compressing the same therebetween so as to form a ground circuit connection from one said piece to the other.

2. The combination with a two-piece steering shaft, of means connecting the two pieces in a ground circuit joint yieldably transmitting torsion between the pieces, said ground circuit joint comprising means forming male and female portions at the respective ends of the two pieces, said female portion having a depressed central region provided with internally received surface presenting means therewithin, a yieldable non-metallic noise insulating member received over the end of the male portion and having side walls lying along at least two opposite sides of the male portion and having an end wall against the end surface of the male portion and interconnecting the side walls to one another, and deflectable means formed of a metallic conductor and received in the noise insulating member end wall so as to have end parts protruding in opposite directions from the latter, said noise insulating member and said male portion being received in said female portion with the member end wall disposed between the end surface of the male portion and the internally presented surface within the female portion, said just-named surfaces respectively abutting the included protruding parts of the deflectable means and compressing the same therebetween so as to form a ground circuit connection from one said piece to the other.

3. The combination with a multiple piece steering shaft, of means connecting at least two pieces thereof in series in a ground circuit universal joint yieldably transmitting torsion therebetween, said universal joint comprising means forming male and female portions at the respective ends of the two pieces, said female portion having a depressed central region provided with internally received surface presenting means therewithin, a yieldable non-metallic noise insulating member received over the end of the male portion and having side walls lying along at least two opposite sides of the male portion and having an end wall against the end surface of the male portion and connecting the side walls to one another, and a coil spring of conductive metal received in the noise insulating member end wall so as to protrude in opposite directions therefrom, said noise insulating member and said male portion being received in said female portion with the member end wall disposed between the end surface of the male portion and the internally presented surface within the female portion, said just-named surfaces respectively abutting the included protruding coil spring and compressing the same therebetween so as to form a ground circuit connection from one said piece to the other.

4. In a torque transmitting joint connected between two substantially axially aligned shaft pieces disposed in closely spaced proximity, a substantially U-shaped member of a deformable non-metallic material and having a laterally extending, relatively short end wall forming the base thereof and relatively closely spaced and laterally extending parallel side walls forming the legs connected to the base, said member being arranged in the joint for yieldably coupling the two said shaft pieces together, with the opposite faces of each said side wall engagaing a different one of said pieces and the end wall being transversely disposed and situate in the space between the closely spaced proximate end surfaces of the shaft pieces, said member having an opening formed in the end wall thereof arranged to extend from one said proximate end surface to the other, and a metallic conductor received in said opening having a convoluted central section and deflectable end portions extending in opposite directions therefrom and protruding out the ends of the openings so as deflectably to engage the proximate end surfaces of the two shaft pieces.

5. In an electrically conductive torque transmitting joint connected between two substantially axially aligned shaft pieces disposed in closely spaced proximity, a substantially U-shaped member of a deformable non-metallic material and having a laterally extending, relatively short end wall forming the base thereof and relatively closely spaced and laterally extending parallel side walls forming the legs connected to the base, said member being arranged in the joint for yieldably coupling the two said shaft pieces together, with the opposite faces of each said side wall engaging a different one of said pieces and the end wall being transversely disposed with respect to and situate in the space between the closely spaced proximate ends of the shaft pieces, said member having an opening formed in the end wall thereof arranged to extend from one said proximate end to the other, and a metallic conductor received in said opening having a convoluted central section and deflectable end portions extending in opposite directions therefrom and protruding out the respective ends of the opening so as deflectably to engage the said proximate ends of the two shaft pieces and provide an electrically conductive path therebetween.

6. In a torque transmitting joint connected between two substantially axially aligned shaft pieces disposed in closely spaced proximity, a substantially U-shaped member of a deformable non-metallic material and having a laterally extending, relatively short end wall forming the base thereof and relatively closely spaced and laterally extending parallel side walls forming the legs connected to the base, said member being arranged in the joint for yieldably coupling the two said shaft pieces together, with the opposite faces of each said side wall engaging a different one of said pieces and the end wall being transversely disposed and situate in the space between the closely proximate end surfaces of the shaft pieces, said member having a tortuous opening formed in the end wall thereof arranged to extend from one proximate end surface to the other, and a metallic conductor embedded in the end wall of said member so as to follow along in the path of said tortuous opening and having a convoluted central section and deflectable end portions extending in opposite directions therefrom and protruding out the ends of the opening so as deflectably to engage the proximate end surfaces of the two shaft pieces.

References Cited in the file of this patent

UNITED STATES PATENTS

| Number | Name | Date |
|---|---|---|
| 777,215 | Meston | Dec. 13, 1904 |
| 1,032,454 | Wainwright | July 16, 1912 |
| 1,823,977 | Hendee | Sept. 22, 1931 |
| 1,917,481 | Anderson | July 11, 1933 |
| 2,047,838 | Smith | July 14, 1936 |
| 2,136,555 | Loftis | Nov. 15, 1938 |
| 2,272,900 | Sawrer | Feb. 10, 1942 |
| 2,396,848 | Haushalter | Mar. 19, 1946 |
| 2,420,897 | Milton | May 20, 1947 |
| 2,454,567 | Pierson | Nov. 23, 1948 |